(12) United States Patent
Delean

(10) Patent No.: US 6,181,836 B1
(45) Date of Patent: *Jan. 30, 2001

(54) METHOD AND SYSTEM FOR NON-DESTRUCTIVE IMAGE EDITING

(75) Inventor: Bruno Delean, Labege (FR)

(73) Assignee: MGI Software Corporation, Richmond Hill (CA)

( * ) Notice: Under 35 U.S.C. 154(b), the term of this patent shall be extended for 0 days.

This patent is subject to a terminal disclaimer.

(21) Appl. No.: 08/933,798

(22) Filed: Sep. 19, 1997

Related U.S. Application Data

(63) Continuation of application No. 08/327,421, filed on Oct. 21, 1994, now Pat. No. 5,790,708, which is a continuation of application No. 08/085,534, filed on Jun. 30, 1993, now abandoned.

(30) Foreign Application Priority Data

Mar. 25, 1993 (FR) .................................................. 93 03455

(51) Int. Cl.[7] ................ G06K 9/54; G06K 9/60
(52) U.S. Cl. .................. 382/302; 382/305; 382/311; 345/428; 345/501; 345/507
(58) Field of Search ..................... 382/276, 232, 382/302, 305, 311, 244, 309; 345/418, 419, 433, 435, 436, 439, 501, 508, 511, 507, 428

(56) References Cited

U.S. PATENT DOCUMENTS

| | | |
|---|---|---|
| 4,288,821 | 9/1981 | Lavallee et al. ............. 358/293 |
| 4,393,399 | 7/1983 | Gast et al. ................ 358/80 |
| 4,546,385 | 10/1985 | Anastassiou ............. 358/133 |
| 4,577,219 | 3/1986 | Klie et al. ............... 358/78 |

(List continued on next page.)

FOREIGN PATENT DOCUMENTS

| | | | |
|---|---|---|---|
| 0198269 | 10/1986 | (EP) | .................. G06F/15/66 |
| 0365456 | 4/1990 | (EP) | .................. G06F/15/72 |
| 0392753 | 10/1990 | (EP) | .................. H04N/1/387 |
| 0462788 | 12/1991 | (EP) | .................. G06F/15/72 |

(List continued on next page.)

OTHER PUBLICATIONS

L. Wiliams, *Computer Graphics,* vol. 17, pp. 1–11 (Jul. 1983).
Burt et al., *IEEE Transactions on Communications,* vol. COM–31, No. 4, pp. 532–540 (1983).
T. Porter and T. Duff, *Computer Graphics,* vol. 18, pp. 253–259 (Jul. 1984).
G.J. Holzmann, *Beyond Photography, The Digital Dardkroom,* (Prentice–Hall, 1988), pp. 15–73.
K.C. Posch and W.D. Fellner, *ACM Transactions On Graphics,* vol. 8, pp. 1–24 (Jan. 1989).
ZSoft Corporation, *PC Paintbrush IV Plus,* pp. v–x, 21–24, 59–72, 79–80, 95–96, 139–150 (1990).
J.D. Foley et al., *Computer Graphics: Principles and Practices,* 2nd ed., (Addison–Wesley, 1990), pp. 201–213, 815–843.

(List continued on next page.)

*Primary Examiner*—Bhavesh Mehta
(74) *Attorney, Agent, or Firm*—Blakely, Sokoloff, Taylor & Zafman

(57) ABSTRACT

A method for non-destructive, selectably reversible image compositing, including providing a displayed image including at least a region of an original image, modifying the displayed image to produce a modified displayed image, and producing a modified image file including at least the displayed image and not including the modified displayed image and also including resolution independent parameters operative for modifying the displayed image to produce the modified displayed image. A system is also described and claimed.

16 Claims, 10 Drawing Sheets

U.S. PATENT DOCUMENTS

| | | | |
|---|---|---|---|
| 4,578,713 | 3/1986 | Tsao et al. | 358/283 |
| 4,656,467 | 4/1987 | Strolle | 340/727 |
| 4,718,104 | 1/1988 | Anderson | 382/41 |
| 4,775,858 | 10/1988 | Stapleton et al. | 340/724 |
| 4,833,625 | 5/1989 | Fisher et al. | 364/518 |
| 4,868,764 | 9/1989 | Richards | 364/518 |
| 4,910,611 | 3/1990 | Cok | 358/453 |
| 5,065,346 | 11/1991 | Kawai et al. | 395/128 |
| 5,117,468 | 5/1992 | Hino et al. | 382/41 |
| 5,119,081 | 6/1992 | Ikehira | 340/723 |
| 5,119,442 | 6/1992 | Brown | 382/41 |
| 5,121,448 * | 6/1992 | Katayama et al. | 382/57 |
| 5,142,616 | 8/1992 | Kellas et al. | 395/135 |
| 5,157,488 | 10/1992 | Pennebaker | 358/133 |
| 5,179,639 | 1/1993 | Taaffe | 395/128 |
| 5,179,651 | 1/1993 | Taaffe et al. | 395/154 |
| 5,239,625 | 8/1993 | Bogart et al. | 395/128 |
| 5,251,271 | 10/1993 | Fling | 382/44 |
| 5,263,136 * | 11/1993 | DeAguiar et al. | 395/164 |
| 5,270,836 | 12/1993 | Kang | 358/459 |
| 5,475,803 | 12/1995 | Stearns et al. | 395/136 |
| 5,548,708 * | 8/1996 | Sakashita et al. | 395/162 |

FOREIGN PATENT DOCUMENTS

| | | | |
|---|---|---|---|
| 0512839 | 11/1992 | (EP) | H04N/5/272 |
| 0528631 | 2/1993 | (EP) | G06F/15/72 |
| 0544509 | 6/1993 | (EP) | G06F/15/72 |
| 2702861 | 3/1993 | (FR) | G06F/15/66 |
| 9115830 | 10/1991 | (WO) | G06F/15/72 |
| 9218938 | 10/1992 | (WO) | G06F/15/20 |

OTHER PUBLICATIONS

W.B. Pennebaker and J.L. Mithchell, *JPEG Still Image Data Compression Standard,* (Van Nostrand Reinhold, 1993), pp. 337–348, 497–502.

C. Eliezer, *Seybold Report on Publishing Systems,* vol. 22, No. 9., Table–of–Contents page and pp. 3–7 (1993).

Scopyr, *Digital Image Capture and Exploitation of Pyramidal Images,* brochure by AVELEM: Mastery of Images, Gargilesse, France.

* cited by examiner

X=GLOBAL FUNCTIONS
O=INTERPOLATED FUNCTION

METHOD AND SYSTEM FOR NON-DESTRUCTIVE IMAGE EDITING

CROSS-REFERENCE TO RELATED APPLICATIONS

This application is a continuation of U.S. application Ser. No.08/327,421, filed on Oct. 21, 1994, now U.S. Pat. No. 5,790,708, which in turn is a continuation of U.S. application Ser. No. 08/085,534, filed on Jun. 30, 1993, now abandoned. The contents of both cited applications are hereby incorporated by reference into the present disclosure.

BACKGROUND OF THE INVENTION

This invention relates to computer processing in general, and more particularly to a method and system for image processing. The patent application claims priority of French patent application No. 93.03455, filed Mar. 25, 1993, the contents of which are herein incorporated by reference.

The present invention was created in response to the shortcomings of the current generation of image retouching systems. Other retouching systems use one of two methods for handling images: (1) high resolution/low resolution (high res/low res), and (2) virtual image. Each of these two approaches overcomes some major obstacles, however neither fully responds to the needs of today's color professionals for high quality, and fast response at an affordable price.

In the high res/low res approach, the complete scanned image (referred to as the "high res" image) is subsampled to yield a much smaller image (referred to as the "low res" image). Because previous image retouching systems did not yield "real time" performance when handling large images (over 10M or 10 million bytes), it was necessary to invent an approach to allow the retouching system work on a smaller, i.e. low res image that would yield acceptable response times for the operator. Using this approach, retouching actions are stored in a script. When retouching is complete, the script is typically passed to a more powerful, and expensive, server and "executed." That is, the actions contained in the script are applied to the high res image, which results in a high quality final image. The disadvantage of this approach is that the operator does not work with the actual image or at highly detailed levels (particularly for a magnified "close-up" of a portion). As a result, it is not always possible to perform highly detailed retouching actions such as silhouetting and masking. Moreover, unpleasant surprises may occur upon execution.

The virtual image approach, commonly used by desktop image editing packages (e.g. MacIntosh or Windows types), manipulates a copy of the actual image held in memory. In some cases, one or more copies; or intermediate drafts are held, enabling the user to revert to at previous copy if an error is introduced. Using the virtual image approach, the image itself is transformed as retouching effects are applied.

The virtual image approach suffers two important shortcomings: first, large amounts of memory are required; and second, each effect is applied immediately to the entire image so that complex manipulation, such as large airbrushing, scaling and rotation, incur long processing delays.

Prior image retouching systems have used large mainframe computers or work stations and proprietary hardware. For example, U.S. Pat. No. 5,142,616, issued Aug. 25, 1992 to Kellas, et al., teaches an electronic graphic system. In this system, data relating to a user-defined low resolution image functions to control an image by the combining other image data with data defining a low resolution representation of the initial image. Once desired modifications have been achieved, the image is displayed on a display monitor so that a low resolution control image is converted to a high resolution representation. Stapleton, et al., U.S. Pat. No. 4,775,858, issued Oct. 4, 1988, also teaches the use of a large frame store to produce an image of higher resolution than that found on a television screen.

Due to the high amount of memory required for processing, personal computers have proven very slow and marginally acceptable. Moreover, even with larger mainframe systems, there is not always a good correlation between the monitor and the printed image since there is not always a way to visualize the final image on the display device. Thus, discrepancies can be introduced due to differences between screen resolution and print resolution. Other relevant patents include: U.S. Pat. No. 5,179,651 issued Jan. 12, 1993 to Taaffe, et al., U.S. Pat. No. 5,065,346, issued Nov. 12, 1991 to Kawai, et al., U.S. Pat. No. 4,656,467, issued Apr. 7, 1987 to Strolle, U.S. Pat. No. 4,833,625, issued May 23, 1989 to Fisher, et al., U.S. Pat. No. 4,288, 821, issued Sep. 8, 1991 to Lavallee, et al., and U.S. Pat. No. 4,546,385, issued Oct. 8, 1985 to Anastassiou.

Numerous image processing procedures currently exist. Common to all procedures is modification of an image through recalculation operations to irreversibly rearrange dots or picture elements ("pixels") of an original image (or those resulting from the most recent modification) into a new arrangement.

Perhaps the greatest disadvantage of known procedures stems from the image that is displayed on the monitor not being identical to the image that will eventually be printed, rendering the operator unable to see the work as it will actually appear in print. Anomalies and discrepancies can therefore occur in the printed image. Known procedures cannot resolve the fact that the image displayed on the operator's monitor screen is in most cases vastly less defined than the scanned image held in the computer's memory. (This is untrue only in the case of small, low resolution images.) Resolution (as measured in dots per inch) of modern display monitors is far less than the resolution of printed color images.

A second and perhaps equally important disadvantage of known image processing techniques is that the image editing effects are applied sequentially, i.e. step-by-step. This incurs a severe degradation in the quality of the original image if many image editing effects are applied to the same portion of an image.

Operations carried out on an image usually require a high degree of processing power. If processing power is unavailable, then the time required to carry out the operation becomes unacceptably long, thus reducing the scope and sophistication of possible operations to be carried out on the image. For example, airbrush strokes are currently extremely limited in size as a result of the extreme processing power needed to calculated image changes.

The irreversible nature of image processing using known procedures precludes the operator from easily implementing any second thoughts. Presently, the only way to correct an airbrush stroke which does not achieve a desired effect is to superimpose a new stroke (instead of merely erasing the unsuccessful stroke). Alternatively, computers equipped with large memory can save intermediate steps. However, this requires a huge amount of memory (e.g., a single 8½"×11"×300 dots per inch (dpi) figure requires over 33 million bytes).

The present invention overcomes these shortcomings and permits rapid and powerful editing functions even on less powerful desktop computers, by employing at least one, more preferably two and most preferably three new and independent processes: preprocessing, image editing, and raster image processing.

The subject invention advantageously uses what I call a Functional Interpolating Transfer System (FITS) to greatly speed editing of an image on standard microcomputers, thus eliminating the need for expensive workstations or special hardware. FITS breaks down image processing into three steps: preprocessing, image editing and FITS raster image processing. This results in a virtually instantaneous response and eliminates waiting for file saving or processing updates. With this technique, limits on file size and resolution disappear.

Preprocessing in the invention (brand name "FITS") involves creating a specially formatted version of an image which allows image editing to progress at rapid speed.

Image editing refers to the process of retouching, combining or otherwise modifying images, to create the final desired image. Image editing involves, in the broadest sense, all processing operations performed on an original image. This includes the combining of images, effects such as sharpening, blurring, brightening, darkening, distortion, and include modifications to the color or appearance of all or part of a original image.

Color changes may be achieved in a variety of ways including global changes to the chromatic range of the image, or selective change to individual colors, e.g. changing blue to red.

Raster image processing ("RIP") is performed in two instances: (1) each time a new screen view is generated for display on a monitor, and (2) when an output page is generated for the purpose of printing or incorporated into another system such as a desktop publishing system. FITS raster image processing combines the input images with the modifications generated in the second stage (image editing) to create either a screen or print image. The output image generated by the FITS RIP can have any resolution; thus it is said to be resolution independent.

FITS raster image processing ("FITS RIP") involves taking the ensemble of image manipulations (the various steps or "layers" of changes) that are performed during the image editing process and computing a single image for purposes of printing or display on a monitor. Modifications to the image, made during image editing, are characterized in a manner that is independent of the resolution of the input images or final output image. During a FITS RIP, layers are first combined mathematically for each pixel or selected pixels in the desired image, rather than by applying each layer successively to the original images. For each final pixel, a single mathematical function is generated that describes the color, in an arbitrary color space, at that point. If as preferred, only a sample of pixels are fully computed for each layer of change, the color values of intermediate pixels are computed by averaging the mathematical functions of the neighboring pixels and applying that function average to the original pixel's color, rather than simply averaging the color values of the surrounding pixels. This approach results in a time savings in overall image handling and a higher quality resulting image.

In the FITS approach, the image editing actions are characterized by parameters to mathematical functions and these are stored layer-by-layer in a file separate from the original image(s). Each intermediate modification to the image is effectively saved in a layer and each layer can be independently modified, deleted or reordered. The parameters can be stored for points in a grid that is itself independent of the "dots-per-inch" resolution (dpi) of either the original imported images, or the final output images. As a result, images for display or print can be generated at an arbitrary resolution.

Substantially less memory is required during image editing than with the virtual image approach since only the changes to each layer are stored, not entire image each time. As a result, a sophisticated, heavily retouched new image consisting of over 10 layers can be described in a FITS file of 2–5 megabytes (2–5M), as compared with over 30M (megabytes) for existing virtual image systems to store a 1 page new image (at 300 dpi resolution). Thus, the FITS approach yields a 10 to 1 average savings per page of image, and substantially more for larger images or higher resolutions. Note that 600 dpi images are now quite common for high quality publishing, and this is likely to increase in the future.

To sum up, current computerized image processing for obtaining a high definition image suffers from the dual disadvantages of requiring extremely high processing power, a limitation of productivity and creativity for the operator due to the irreversibility of image editing steps, and the quality restrictions inherent in a pixel-based approach.

The subject invention, on the other hand, provides a computerized image processing procedure which enables the operator to rapidly carry out advanced graphic operations, and to reverse decisions as required—without in any way affecting the definition or precision of the final image.

SUMMARY OF THE INVENTION

The invention provides an image processing system for the creating and editing images that are resolution independent and characterized by a series of layers, or image objects, that can be combined together to yield an output image, at any resolution, for display or print. The new method of image processing in a computerized system creates a high performance image representation, that yields much faster image processing by supplying data defining an original image into the system and reorganizing the original image data.

One aspect of this method (pre-processing, which I call "IVUE" format) comprises the following steps: (1) supplying data defining the original image into the system, (2) assigning pixels from the original image to pixels in the new image format in such a way that the new image is organized in groups (preferably rectangles and most preferably squares), each of which can be individually compressed (using JPEG or another compression algorithm) to yield reduced image size and faster access over a network, (3) creating a second, lower resolution, image by averaging groups of pixels falling within a first predetermined area (or neighborhood) into an averaged pixel, and performing this computation across the entire original image; this second image is also organized in groups, e.g. squares, (4) repeating the previous step, and thereby creating succession of decreasing resolution images, which are stored adjacent to the first two, until a number of pixels less than or equal to a preselected number of pixels remain, and (5) saving the resulting image representation on a storage device.

Also provided is a method for image processing in a computerized system that involves applying changes to one or more original images as a series of "layers" in which the changes are recorded as resolution-independent mathematical functions. This approach has the property that only the final result of the retouching effects in a layer needs to be calculated or characterized and the effects are wholly or partially reversible. The layers themselves are independent and may at any time be modified, deleted, or reordered. The changes in each layer are generally characterized in a way that is independent of resolution.

This aspect of the method comprises the following steps: (1) for a layer 1, 2, 3, etc., generally number "i", displaying the results; of the image processing up to and including all effects applied and original effects inserted for the "i–1"th layer (e.g. 5th layer) (2) recording all effects applied in the ith layer (e.g. 6th layer) as parameters to mathematical functions that define the effect, so that for each pixel in the displayed image that is modified there is a single function that describes the resulting modification, (3) when the operator terminates processing of the ith layer these parameters are saved along with the parameters that describe changes to the preceding i–1 layers.

Also provided is a method for image processing in a computerized system that enables a raster image to be computed, either with the ability of displaying the image on a computer monitor or for printing the image.

This method involves: (1) sampling an original image to be processed with a definition grid so as to retain a predetermined number of dots from all of the dots contained within the original image, the predetermined number being equal to or less than the number required to either display the result on a computer monitor or to generate an output file destined to be printed; and (2) for each dot in the grid to generate a single mathematical function that represents the cumulative effect of all the layers in the image at that point. This is done by processing the resulting image into elementary recurrent operations each broken down into three parts and providing, based on the result of the previous elementary operation, these three parts added to each other, (3) filling in sufficient additional dots, or pixels, within the grid to reach the required resolution for screen or print by interpolating the functions at the surrounding gridpoints to obtain a single function that can be applied to intermediate pixels and will yield an interpolated color value for that pixel, (4) computing the color value results for each pixel, and (5) either printing or displaying the result, or storing the result on a computer storage device.

The invention may use a method of image processing in a computerized system, comprising: (a) supplying data defining an original image into the system, (b) assigning pixels from the original image to pixels in a new first image format so that the first image is organized into groups of pixels, each of the groups being individually compressible to yield a reduced size image, and (c) reducing the number of assigned pixels to form a reduced resolution image by averaging (preferably using a Gaussian function to weight the average for pixel proximity) a particular number of adjacent pixels falling within a first (preferably predetermined) area into a first averaged pixel, organized by the groups of pixels, and performing this computation across the entire first image format, to form a reduced definition image.

This method may (and preferably does) further comprise reducing the number of the first averaged pixels by averaging groups of pixels falling within a second predetermined area into a second averaged pixel, organized by the groups of pixels, performing this computation across the entire second image format, and (preferably) repeating this step until a preselected or lower number of pixels remain, the remaining pixels forming a reduced definition image. Data defining the reduced definition image may be modified by a user to obtain a desired result and the system or user may save a copy of the data or mathematical functions defining the pixels that form the desired result. Moreover, the data defining the original image may be added to the data defining the pixels forming the desired result, and forming an image from the added data.

The invention may also include a method of raster image processing which includes: (a) adding data defining an original image to data defining modifications to a reduced definition image, and (b) forming an image from the added data. Preferably, this is accomplished by a computerized system which comprises: (a) means for adding data defining pixels forming an original image to data defining modifications to a reduced definition image, and (b) means for forming an image from the added data.

The invention may also include a computerized system for image processing, comprises: (a) means for assigning pixels from an original image to pixels in a new first image format so that the first image is organized into compressible groups of pixels, and (b) means for reducing the number of assigned pixels to form a reduced resolution image by averaging a particular number of adjacent pixels falling within a first (preferably predetermined) area into a first averaged pixel, organized across the entire first image format, to form a reduced definition image. Preferably, means are provided for reducing the number of the first averaged pixels by averaging groups of pixels falling within a second predetermined area into a second averaged pixel, organized by the groups of pixels, performing this computation across the entire image format, and repeating this step until a preselected number of pixels remain, the remaining pixels forming a final reduced definition image.

BRIEF DESCRIPTION OF THE FIGURES

FIG. 4B—A schematic illustration of a pixel reduction grid.

DETAILED DESCRIPTION OF THE INVENTION

To aid in understanding the invention, the following overview is provided:

The subject invention was created in response to the shortcomings of the current generation of image retouching systems. The current common personal computer approach, often referred to as virtual image, manipulates a copy of the actual image, which is held in memory.

Figure 1:
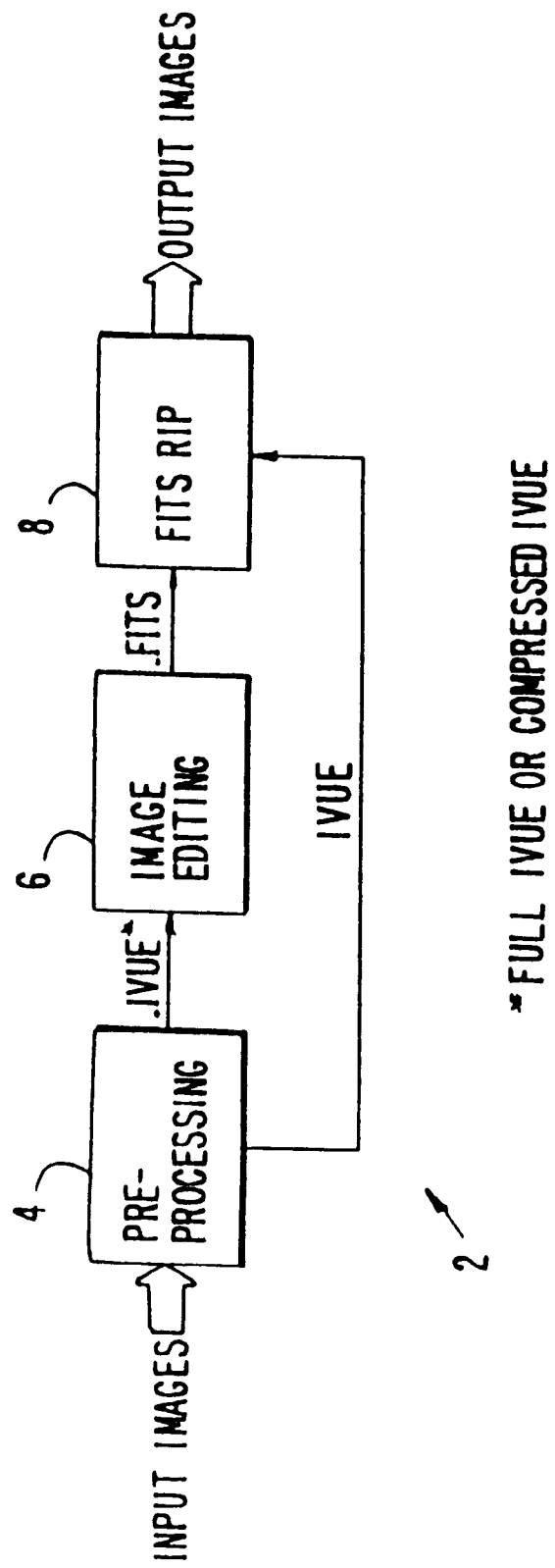
FIG. 1—A schematic representation of processing steps of the invention.
Figure 2:
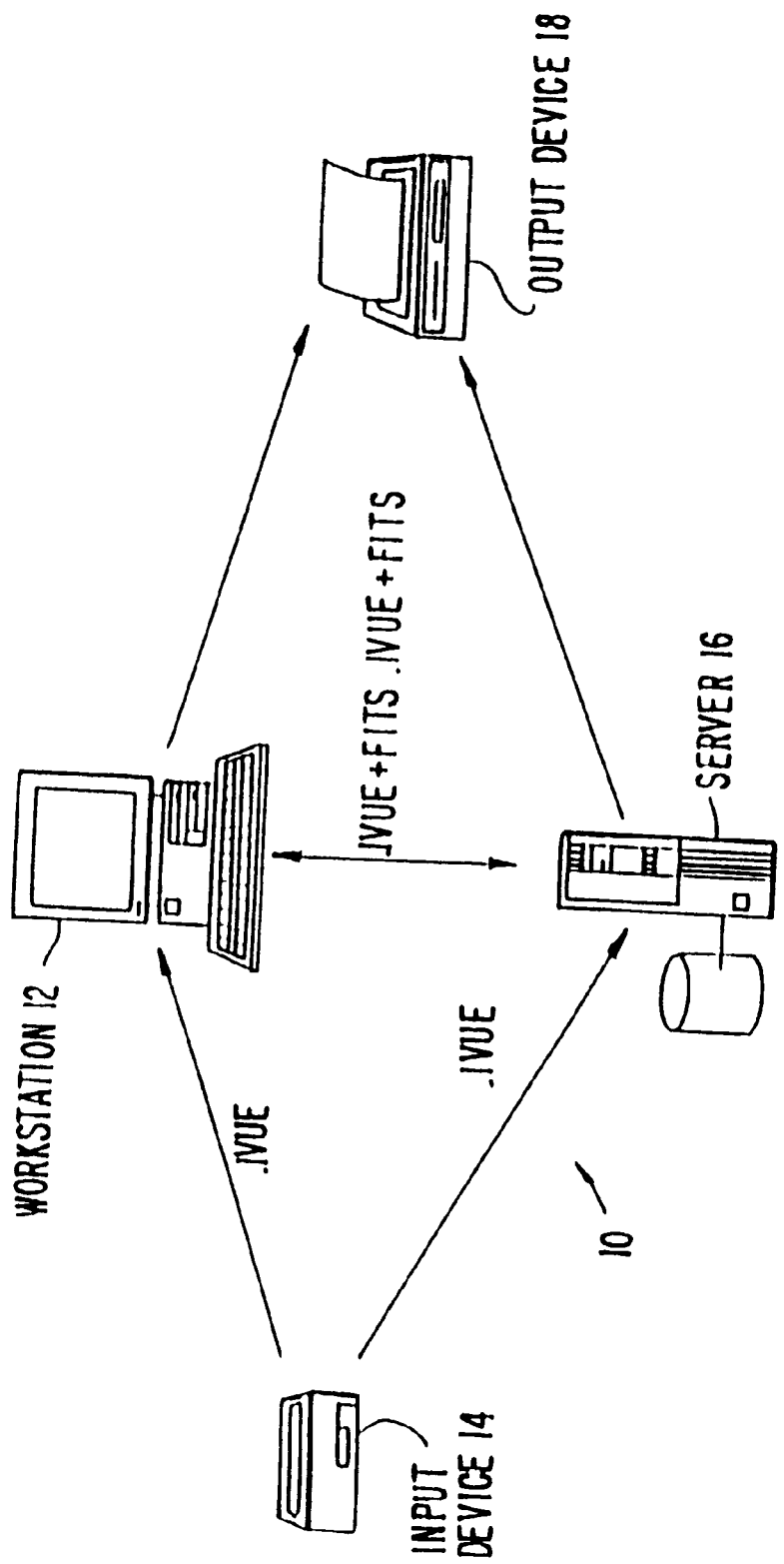
FIG. 2—A schematic representation of interconnections between system hardware.

Functional interpolating transformation system (FITS) takes a radically different approach in which the underlying image is preserved, and changes are recorded in separate layers in a file, named FITS. By processing only changes to the current screen, FITS computes only what is needed, when needed. Further, all modifications are resolution independent and can be used to generate output images at any level of resolution (commonly measured in dots per inch or dpi). FIG. 1 shows an overview of the FITS model, FIG. 2 depicts the interaction of hardware involved, and FIGS. 8A–F show the system in use.

When image editing is complete, the operator initiates a computation which applies the changes across the entire image. This final processing is termed FITS raster image processing (RIP) and is vaguely analogous to Postscript raster image processing (a system for generating the raster image that corresponds; to pages of printed information described using the Postscript language).

Unlike many high-end and mid-range color systems that oblige the operator to work with a low-resolution image, FITS operates in high-resolution, i.e., the operator may at any time access any information contained in the original image(s) without being limited by the FITS processing approach.

The subject invention will now be described in terms of its preferred Embodiments. These embodiments are set forth to aid understanding the invention, but are not to be construed as limiting. Moreover, the invention includes using only some aspects, or indeed, only one aspect, of the most preferred method.

The new image processing system is for creating and editing images that are resolution independent where the images are characterized by a series of layers that can be combined together to yield an output image, at any resolution, for display or print. Note that the term "layers" can also refer to image objects that are managed independently and combined in pixel format for purposes of output.

The general expression for characterizing an image, using this approach, is as follows:

$f_n(x,y)$=a combination of one or more of such components as:

external image(s)
position independent terms
position dependent terms
$f_{n-1}(x,y)$ or prior layers Where $f_n(x,y)$ is the color value of a point of an image, in an arbitrary color space (e.g. RGB, or CMYK), at a layer n.

External image—may be any external image. In FITS, these images are preferably transformed into IVUE format for fast processing. Generally, however, the images may be in any format.

Position independent terms—these are modifications which do not depend on the position of the image element. For example, a color applied in a layer to the entire image.

Position dependent terms—these are geometric transforms, color modifications, etc. supplied selectively to different regions of the image. $f_{n-1}(x,y)$—the function that describes the color in the preceding layer.

The color value of a point (x,y) in layer n may be defined by a single mathematical function which combines an external image or images, position dependent terms, position independent terms, and the function defining the point (x,y) for the preceding layer.

THREE STEPS

Figure 3:
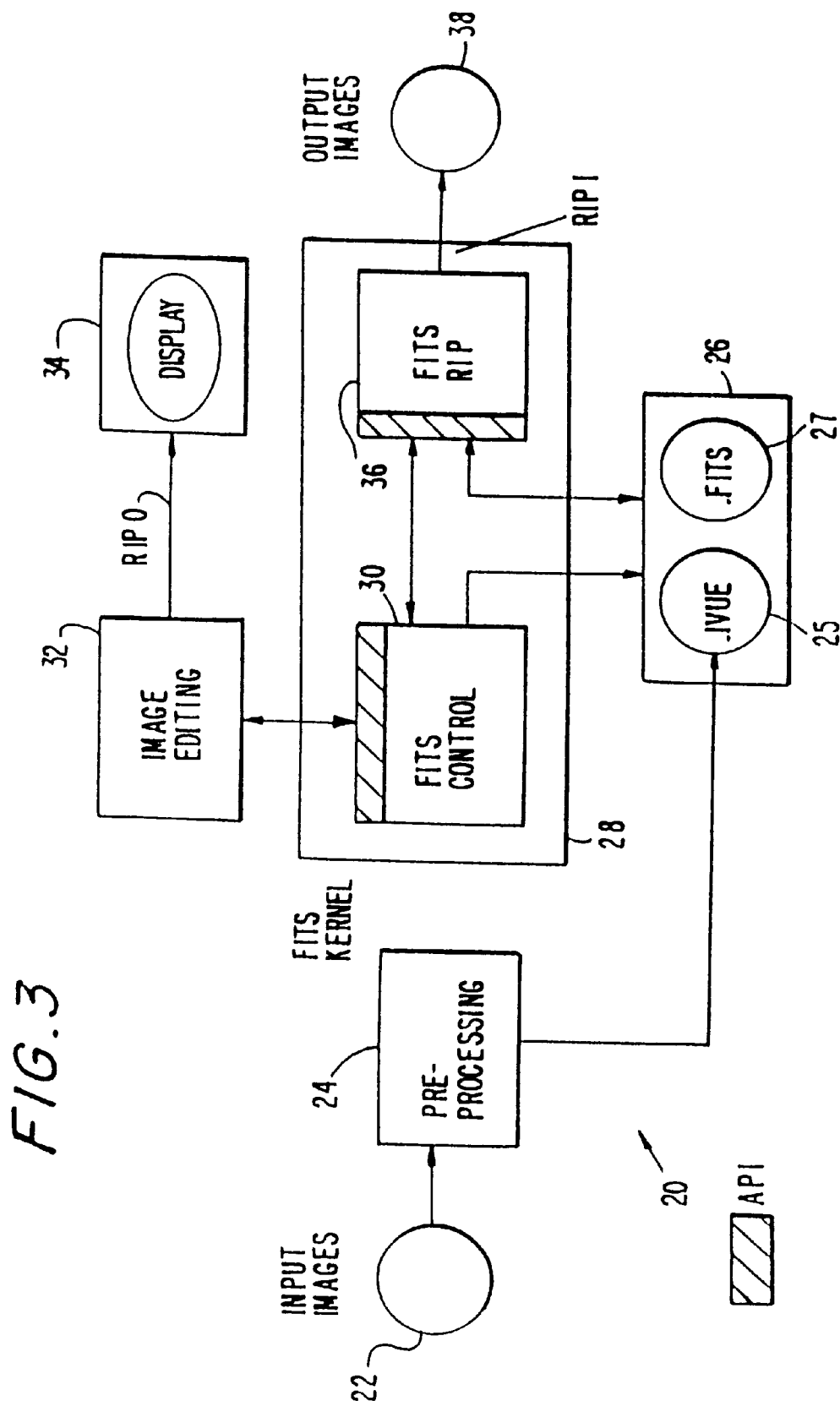
FIG. 3—A schematic representation of software architecture.
Figure 6:
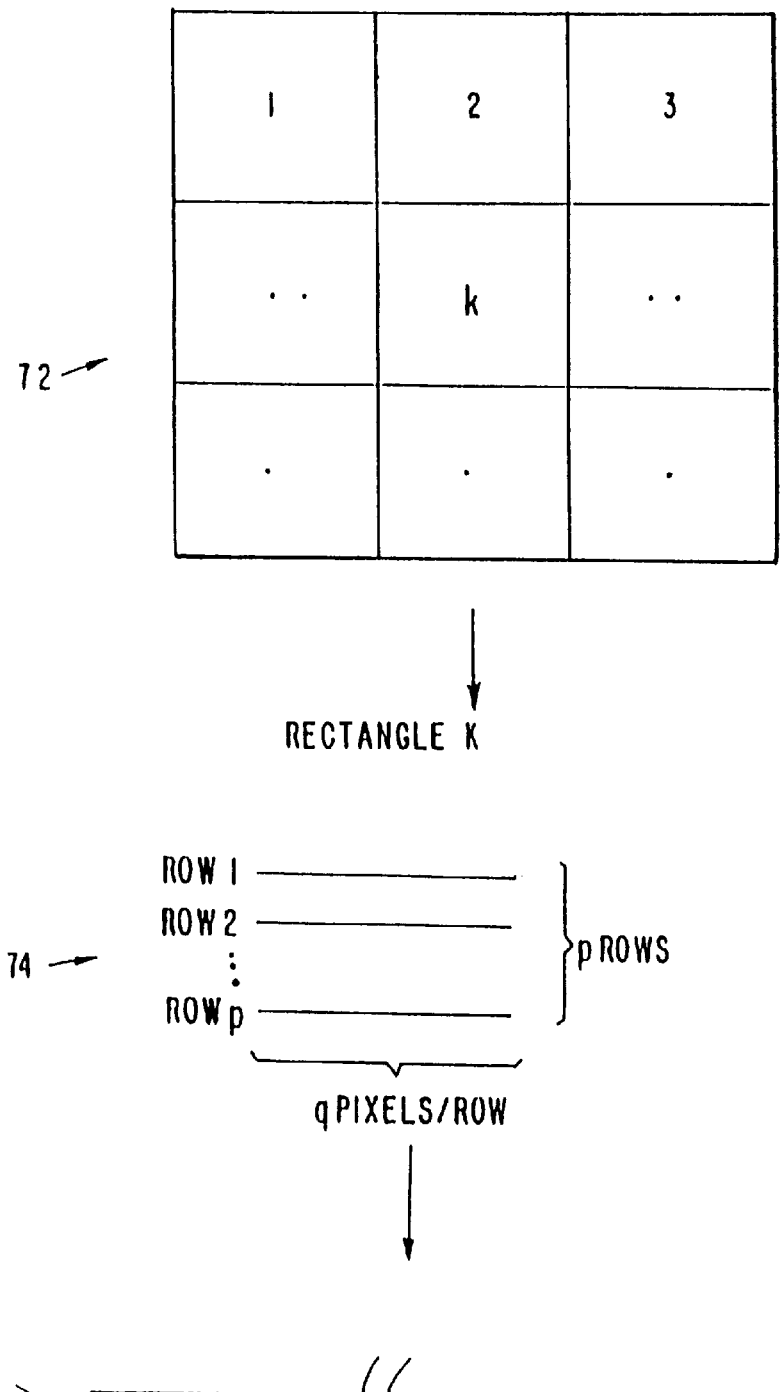
FIG. 6—A schematic illustration of the FITS reduction.

FITS comprises three independent processes: pre-processing, image editing, and FITS raster image processing (FITS RIP). FITS is overviewed in FIGS. 1 and 6. FIG. 3 illustrates the software architecture.

Prepossessing. Initially the input image, in TIFF or another standard format (such as Postscript), is reorganized to create a specially formatted new file, termed IVUE. The IVUE file is used during image editing and also during the FITS RIP. It is reorganized in such a way that a new screen full of image data may be quickly constructed. The screen's best resolution can be used, both for the full image and for close-up details. As an option, a second IVUE file may be created that is compressed using conventional methods, such as JPEG, or by other methods. The IVUE file contains all of the original image data.

Figure 5:
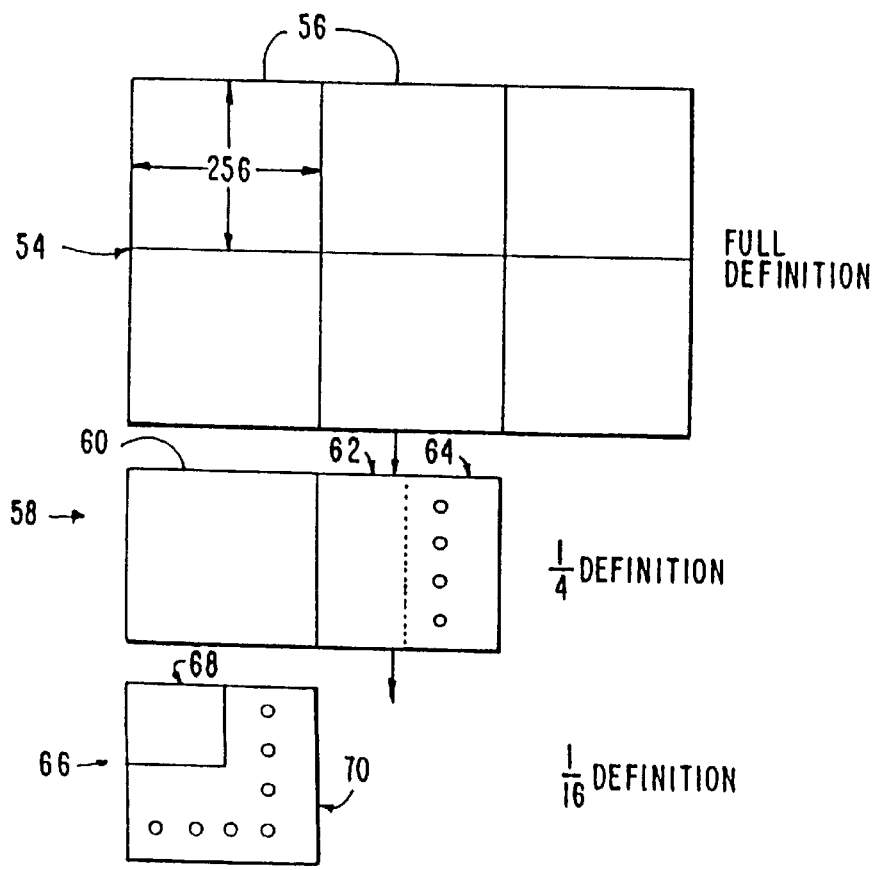
FIG. 5—A schematic illustration of the IVUE format.

The image is divided into squares. Each of the squares in each of the various image representations within the IVUE file may be individually compressed (see FIG. 5). This is a unique approach since other image processing systems compress the entire image. The resulting file, termed .IVUE/C, is considerably smaller than the original file. The actual size of the file depends on the compression level used to generate the IVUE file. Average compression will yield an 8 to 1 average reduction in the size of the image. In a first product to be based on this invention, to be called Live Picture, for example, three compression levels may be selected when creating the IVUE file.

Saving the IVUE sampled files together with the original file takes up only about 30% more space than the original alone. For example, for ¼ sampling with the original being assigned 1, the memory required is $1+\frac{1}{4}+\frac{1}{16}+\frac{1}{64}+\frac{1}{256}\ldots$ or approximately 1.3 times the original file size.

Figure 4A:
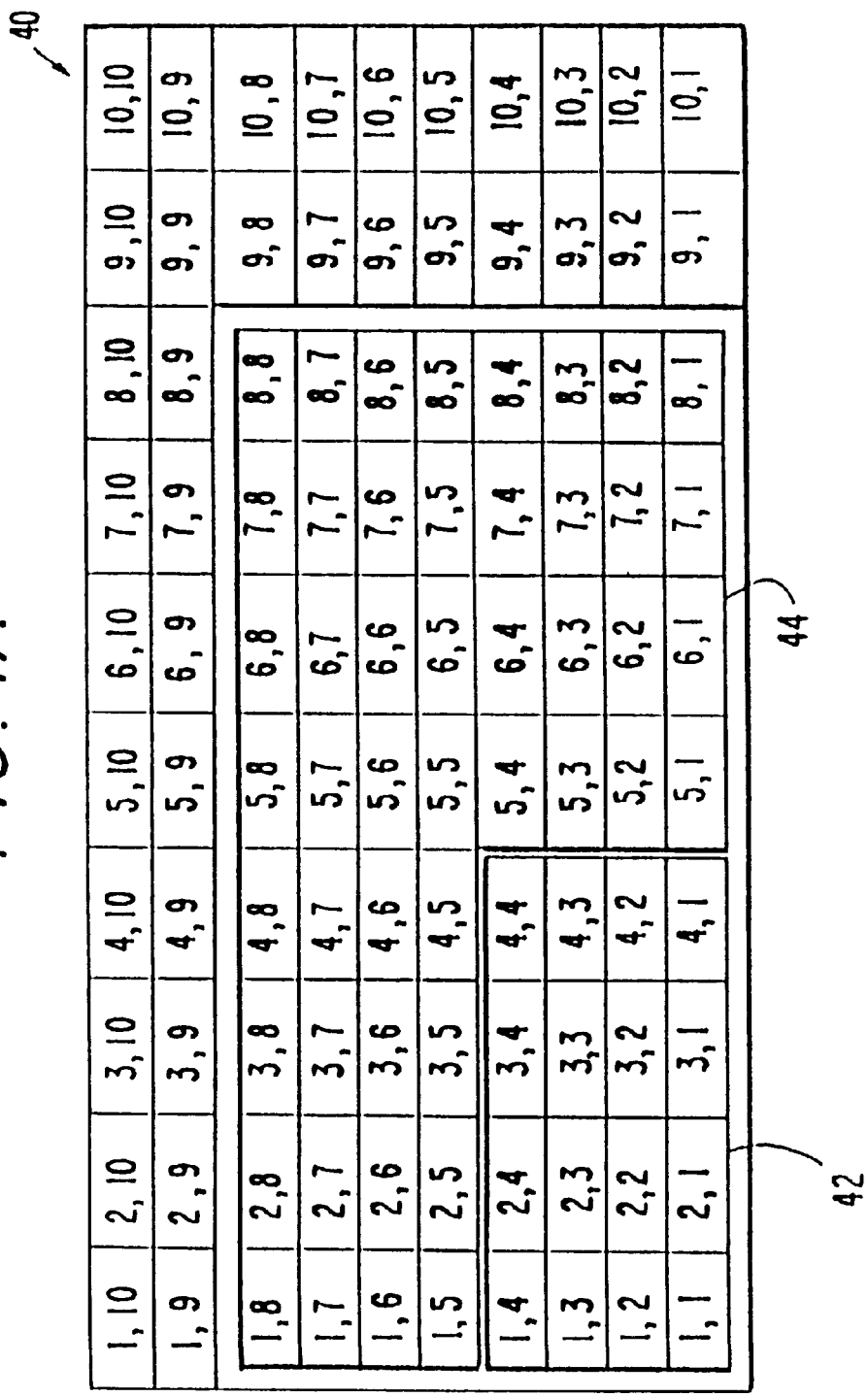
FIG. 4A—A numerical/graphic illustration of a pixel reduction grid.

FIG. 4A shows a 10×10 pixel box in which each of the pixels are identified by a column, row number. The smaller enclosed box is a 4×4 matrix which is reduced to a single point. One way to complete the reduction, or apply the FITS layer to do the RIP, is to select an origin point (in this case, 1,1, is selected). Two points are then selected outside of the box along the column and row, as depicted, point 1,5 and 5,1. By knowing these three pixels, each of the pixels in the box can be identified by a simple division by two. For example, pixel 1,3 can be determined by averaging 1,1 and 1,5. By thinking of column 1,1–1,5 as a vector and row 1,1–5,1 as another vector, each of the pixels can be identified and reconstructed. Another advantage to this system of picking two points outside of the 4×4 pixel square is that a redundancy exists. Returning to FIG. 4A, pixel 1,5 acts as the origin for the 4×4 box above the initial box described. Again, the 5,1 pixels serves as the origin for the next 4×4 pixel box. Turning now to the larger black line square, (having corner points 1,1, 1,8, 8,8, and 8,1, this 16×16 square will after the first set of reductions, be a 4 pixel square which can be handled in much the manner described above. Once the 256 pixel square remains, or some other predetermined sized square or area, the next step of image editing can occur. Alternatively, the IVUE sampling to make a lower resolution image can average 4 pixels to make 1, or sample a large group using weighting (e.g. Gaussian) to achieve any desired ratio or compression.

A compressed image can be stored either on the operator's workstation or on a network file server. This approach greatly reduces the disk requirement. In addition, when the IVUE/C file is held on a file server, network delay in accessing the image is minimized since FITS accesses the IVUE file one screen at a time.

There are two principal advantages of using this compression: (1) only the IVUE file is used during image editing; thus, use of a compressed file decreases the disk requirement on the retouching station, and (2) during image editing, FITS accesses the IVUE file one screen at a time; thus if the image is on a network image server use of the compression option will greatly reduce operator wait times induced by network delay.

The JPEG (or the like) compressed image is used only during the screen editing step, where the quality of the compressed image is perfectly acceptable. However, the full image, also in IVUE format, is used during the FITS RIP, in order to obtain the highest quality image. So while JPEG may be used to improve speed and memory, it does not lessen the quality of image. This last point is key because many people incorrectly assume that the use of JPEG will degrade image quality.

Preprocessing to IVUE format is fast; for example an A4 image takes approximately 1½ minutes on a Mac Quadra. Generally, a TIFF image is reprocessed at the rate of ½ megabyte per second.

The following method may be used to generate an IVUE image, which comprises a succession of reduced resolution images each of which is stored as a rectangle.

1) The original image, in a standard or proprietary image format is opened (i.e., accessed on a storage device).

Figure 4B:
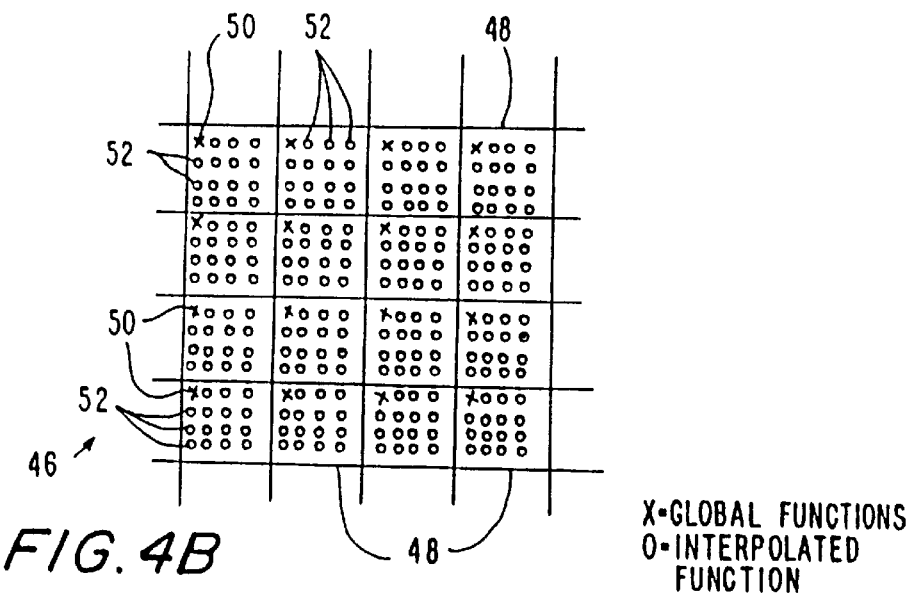

2) The original image is used to create the first, full resolution image in the IVUE file. It is preferably stored as a succession of p pixel×q pixel rectangles. Each rectangle then contains p×q pixels, that is each rectangle can be considered as a series of p rows, each containing q pixels. The rectangles are stored sequentially on disk and for each square (to simplify further) the rows are stored sequential (row 1, row 2, row 3, . . . row p). (See FIGS. 4A, 4B and 5 for organization of rectangles). Each rectangle may be encoded using JPEG or another compression scheme.

3) A subsequent, reduced resolution image is created from the previous image, if there are more than p×q pixels in the previous image. Essentially, a neighborhood of pixels in the original image are averaged to provide a single pixel in the second image. The image is reduced in each dimension, x and y, by a factor of 2 (or whatever is selected) yielding a 4 to 1 reduction in size for the subimage.

The general computation for computing $f_{n+1}(i,j)$, the pixel at point i,j in the n+1st subimage is:

$$f_{n+1}(i,j)=\int \xi(x,y) \cdot f_n(x,y) \, dxdy$$

in which:

$\xi(x,y)$ is an arbitrary probability density function intergrating over the entire space of real numbers, i.e. a weighting function, that takes into account the contribution of the neighboring area. Thus we may consider $\xi(x,y) \in v(2i,2j)$ or a selection of elements in the vicinity.

$\in$ is an element of.

v is a neighborhood of, and thus $v(i,j)$ is the neighboring area of the point i,j.

As a density function, $\xi(x,y)$ satisfies the following:

$$1=\int \xi(x,y) \, dxdy$$

$$0<\xi(x,y)<1 \text{ for all } (x,y)$$

The presently preferred weighting function is a Gaussian density function. However, other functions may be used as well.

Figure 7:
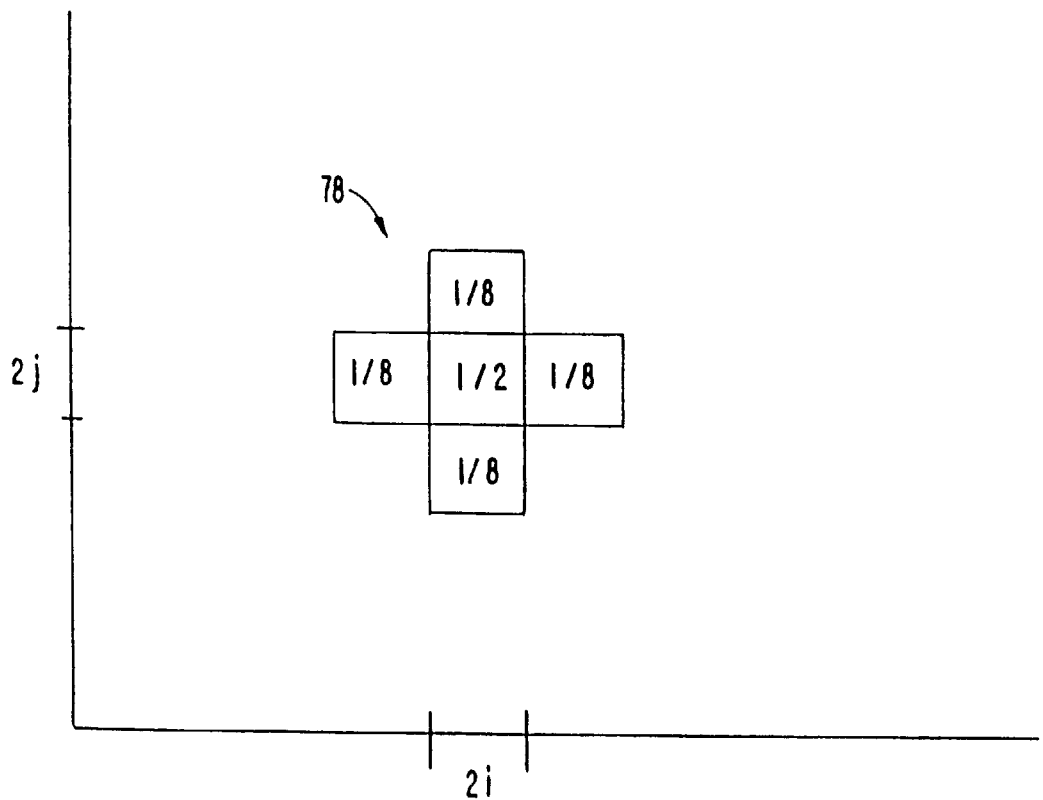
FIG. 7—A schematic illustration of 2i×2j density functions.
Figure 8A:
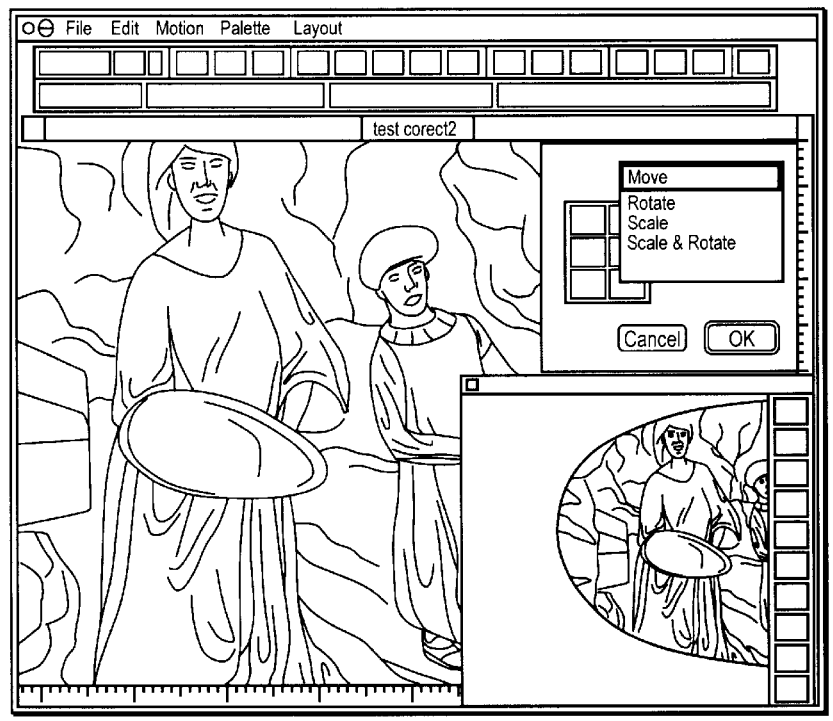
FIGS. 8A–F—Depictions of computer monitors showing the invention in use.
Figure 8B:
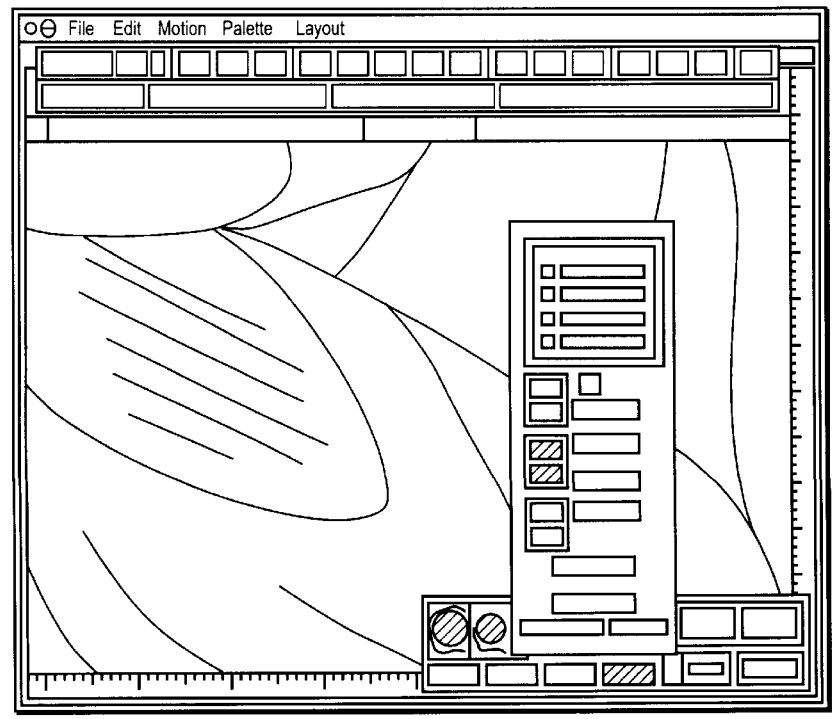
Figure 8C:
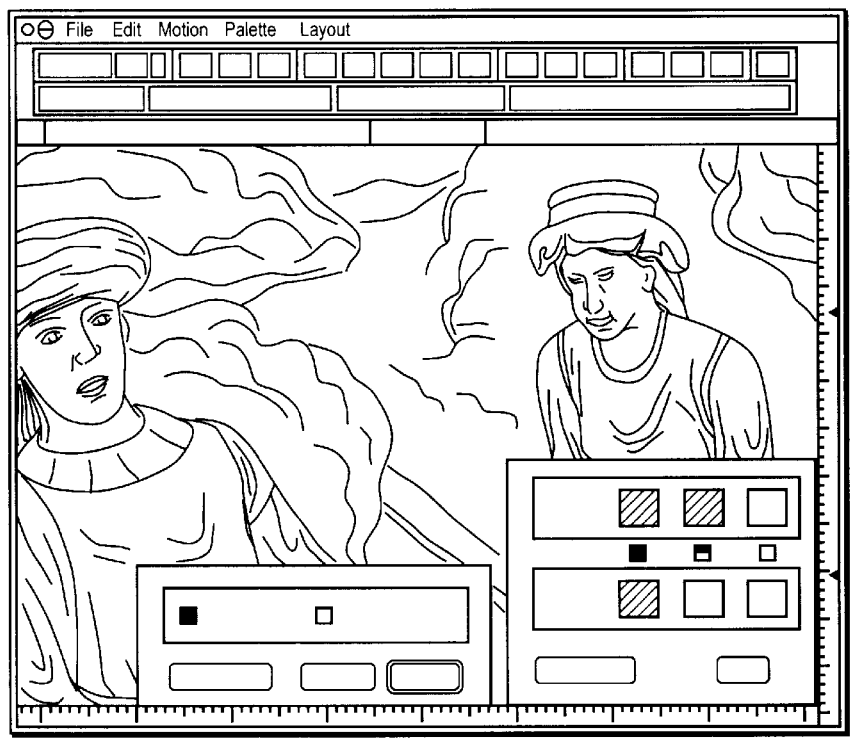
Figure 8D:
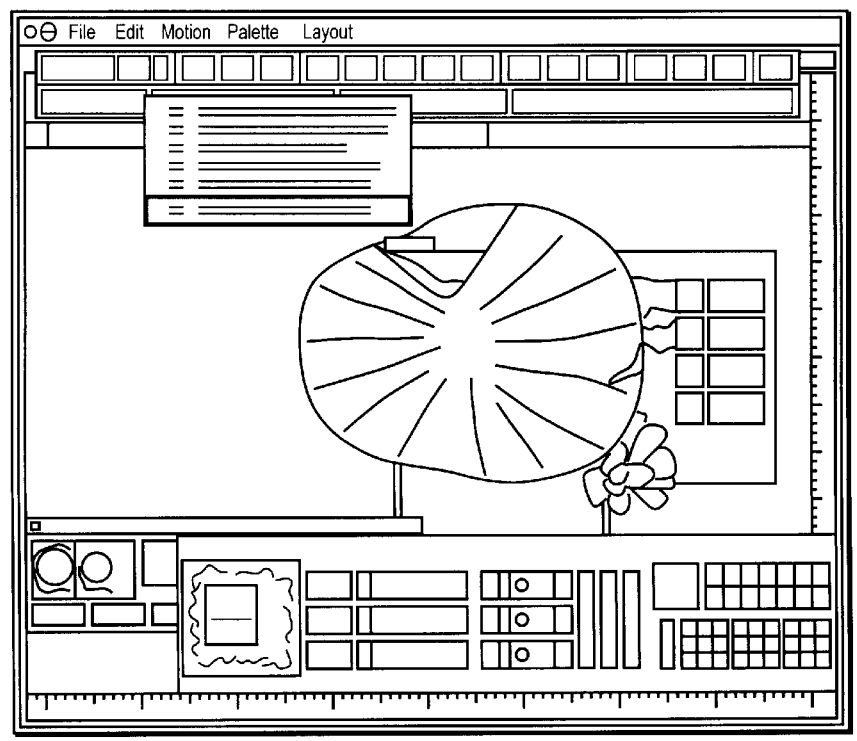
Figure 8E:
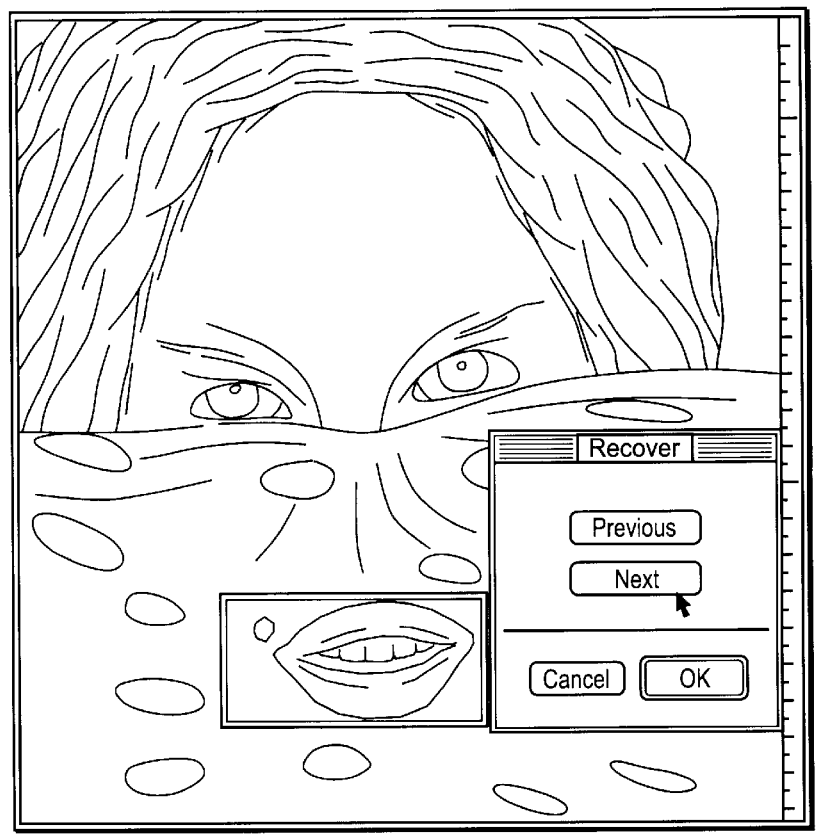
Figure 8F:
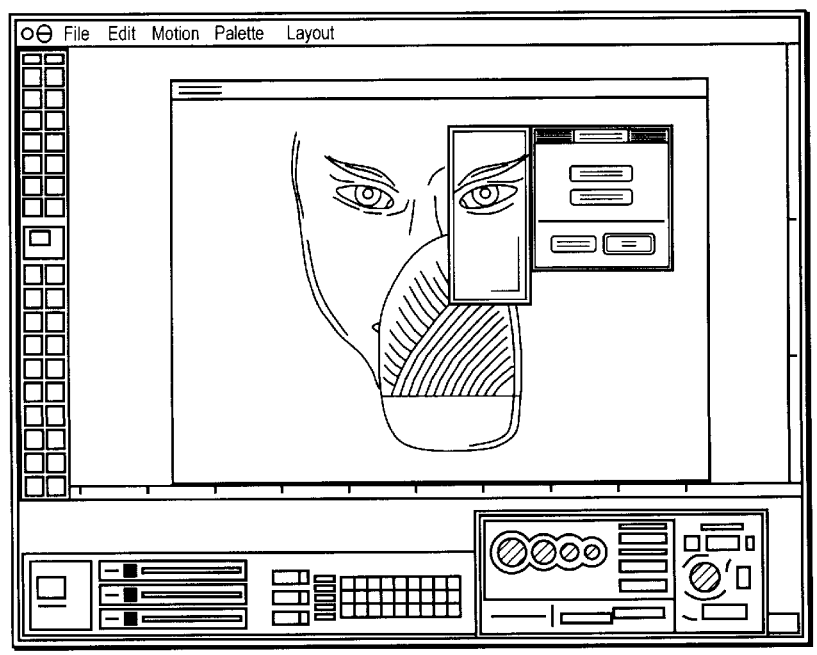

As an example, the neighboring weighted average has been implemented on a computer as depicted in FIG. 7. In this case:

$$f_{n+1}(i,j)=\tfrac{1}{2}(f_n(2i,2j))+\tfrac{1}{8}(f_n(2i-1,2j))+\tfrac{1}{8}(f_n(2i+1,2j))+\tfrac{1}{8}(f_n(2i,2j-1))+\tfrac{1}{8}(f_n(2i,2j+1))$$

Alternatively, an equation which may be used for computing $f_{n+1}(i,j)$, the pixel at point i,j in the n+1st subimage is:

$$f_{n+1}(i,j)=\int \xi_{2i2j}(x,y) \cdot f_n(x,y) \, dxdy$$

where $\xi_{ij}(x,y)$ is the probability density function for pixel (i,j) at point (x,y). Usually, (x,y) is near to the origin point (i,j), that is in the "neighborhood." Thus E is the weight (such as 50% for near points, 20% for more distant points) of any particular neighbor point x,y relative to the "home base" or origin of i,j. The weights are set up to total 100%, and so that E is positive (not zero) in the defined radius of the neighborhood (which can but need not include the whole image). Once E goes to zero, there goes the neighborhood, that is, points at or beyond that distance are not weighted in. Thus $$1=\int \xi_{ij}(x,y) \, dxdy \text{ for all } (i,j) \text{ and}$$

$$0<\xi_{ij}(x,y)<1 \text{ for all } (x,y)$$

This new, reduced image may be stored in rectangles of p×q pixels as well.

4) The third step may be repeated, creating a succession of images, each (say) ¼ the size of the last, until a subimage of less than p×q pixels is created. This is the last subimage. If this last subimage contains less than p×q pixels, the remaining pixels may be filled from the neighboring squares or may be set to 0.

5) The entire image format is saved on a storage device.

Image editing. Image editing refers to the process of retouching, creation and composition of images. The operator successively applies effects such as blur, smooth, and transformations such as rotation and scaling. Additional images can be inserted at any time and, if desired, with transparency and masking.

Each editing action is represented by a mathematical function and recorded in a file named FITS. The FITS file can be considered as a database of commands or layers, and is a very compact representation.

FITS implements types of layers, referred to as FITS modes. For each mode a set of actions are available and can be freely applied. In Live Picture, the operator will be able opt to initiate a new layer at any time, and when a new mode is selected, a new layer is automatically created and all subsequent actions are contained within this new layer (until a new layer is created).

FITS modes include: image insertion (insertion of a scanned image), painting, pattern, filters, lighting effects, mirror, linework and plug-in (i.e. a layer defined by an arbitrary application). Text is treated as a special case of linework, since it can be composed of Bezier curves. In fact, there are two types of image insertion modes: standard and advanced. The advanced mode offers the opportunity to distort the image at the price of additional processing and a slight decrease in response time.

With FITS, each image editing action is represented by a mathematical function. When the operator finishes working on a layer, the parameters of these functions are recorded in a file named FITS. Only the resulting aggregate modifications to the underlying image are recorded. If, for example, the operator applies an effect and then erases it then nothing is stored. Or, an artist may use hundreds of brush strokes to create a complex painting, yet the FITS representation describes the resulting painting and not the sequence of brush strokes used to create it.

Thus, FITS typically only records the final effect and not necessarily each image editing action. This saves processing time and also results in a very compact representation of the image editing session within a FITS file. For example, if an A4 image, stored in a 35 Mbyte file is heavily retouched, in (ten or more layers), the FITS file will only grow about 2–5 MB.

The FITS retouching file may be saved at any time, and may later be reused or modified. At any time, either during the image editing session, each layer can be accessed and re-edited.

FITS Raster Image Processing (FITS RIP).

The invention provides a computerized procedure for creating a raster image. This procedure is used both to create a new view of the image on a computer monitor and to create a high resolution output image. The procedure preferably has the following characteristics:

Based on the area of the image to be raster image processed (IZIP'ed), which is generally determined by the operator, a definition grid is constructed in such a way as to retain, from all the pixels to be processed, points equal at the most to the number that can be displayed on the monitor screen, For fast processing, a ratio of 1 dot to 16 pixels can be used. The area to be RIP'ed refers to a portion or all of the image to be displayed or processed for printing. The objective is to compute the color value resulting from the superposition of a series of layers. The color value is in an arbitrary color space. Commonly, this is in either the color-space named RGB, defined by the three primaries red, green, blue, or in CMYK, defined by the three colors cyan, magenta, yellow and an additional value for black.

For one point in each definition grid, the general expression for the color value of that point is computed. In practice, a simplified form of the general expression is generally used that can describe most image editing actions. This form is termed "elementary operation" and it has the advantage of being relative simple to compute.

The elementary operations are broken down in turn into three stages and when combined a new result (layer i), based on the result of the previous elementary operation (layer i−1). The three stages are:

first, the adoption in the new layer (i) of a color dot (x,y) from the previous layer (i−1) with a weighing ($\alpha_i$) ranging from −100% to 100% (i.e., margins from +1 to −1 and including positive and negative value), second, the importing of an external image ($I_i$) into the layer i, that is, the importing of a color dot from the image (Ii), after chromatic and geometric transformation ($P_i(x,y)$) of this dot to add it to the color dot (x,y) of the layer (i), the degree of replacement of the dot of the layer (i) by the dot imported from the image ($I_i$) being defined by a scalar $\beta(x,y)$ with values from −100% to 100%.

third, an additional color term $\gamma i(x,y)$ applied to the dot (x,y) of the layer (i). This term may take into account painting or other chromatic effects.

each elementary operation (i) being defined by the equation taking account of the previous layer or operation (i−1):

in which:

$\phi_i(x,y) = \alpha_i(x,y) \cdot \phi_{i-1}(x,y) + \beta_i(x,y) \, I_i[P_i(x,y)] + \gamma_i(x,y)$ or alternatively:

where $\phi_i(x,y) = \alpha_i(x,y) \cdot \phi_{i-1}(x,y) + I_i[P_i(x,y)] + \gamma_i(x,y)$ $\alpha_i(x,y)$ is; a scalar function of the dot (x,y) corresponding to the presence at this dot of the image resulting from the previous elementary operation $\phi_{i-1}(x,y)$, $\phi_{i-1}(x,y)$ is a function representing the previous elementary operation, $\beta_i(x,y)$ is scalar function corresponding to the presence at dot (x,y) of a clot corresponding to the imported image, $I_i$ represents the imported image made up of a set of dots, $P_i(x,y)$ represents geometric transforms, including rotation, scaling, distortion and may also include chromatic transforms of imported dot x,y, $\gamma_i(x,y)$ is an additional position dependent term that can affect the color value of pixel (x,y), Each of the terms $\beta_i(x,y)I_i[Pi(x,y)]$ and $\gamma i(x,y)$ may be nil, while the term $\alpha_i(x,y) \, \phi_{i-1}(x,y)$ should generally never be nil for all the dots (x,y). There is generally no part in observing all of the prior image.

Due to the form of the elementary operations, they can be combined to yield a global function that has a simple structure. The global function, defined below, defines the color value at point x,y for an image composed of a number of layers:

$$\left( \sum_{j=1}^{j=q} [\alpha_j(x,y) \cdot I_j[P_j(x,y)]] \right) + \gamma(x,y)$$

or alternatively $$\sum_{j=1}^{j=q} [\alpha_j(x,y) \cdot I_j[P_j(x,y)] + \gamma(x,y)$$

or alternatively $$\sum_{j=1}^{j=q} \alpha_j(x,y) \cdot I_j[P_j(x,y)] + \gamma(x,y)$$

q=number of imported images that make a visible contribution at point x,y, in this global function:

$\alpha_j(x,y)$ is a scalar analogous to the scalar $\alpha_i(x,y)$ of a elementary function and $\alpha_j(x,y)$ .neq. 0(not equal to zero at at least one point).

$I_j$ represents an image or layer j to import $P_j(x,y)$ is $P_i$ an import function analogous to the previous import functions $P_i(x,y)$ $\gamma(x,y)$ is a chromatic function analogous to chromatic functions $\gamma_i(x,y)$, in this procedure, the global function can be generated, but not yet computed, for one point within each grid (depicted in FIG. 4).

since the grid represents a subset of the pixels required for the RIP, it is necessary to generate the remaining points, within each grid. For each additional point in the grid a new function is created by interpolating the function between the two nearest points where the global function has been computed. This process is termed functional interpolation. The simplest form of the function is to created a weighted average based on distance.

As an example, assume the grids are 16×16 and the global function has been created for dots (1,1) and (1,17). Further, that the global function at dot (1,1) yields cos(x,y) when simplified and the global function at dot (17,1) yields sin(x,y) when simplified. Then the interpolated function at point (1,8) will be (9/16)cos(x,y)+(7/16)sin(x,y). If the use of a 4×4 box is employed, and points 1 and 5 computed, the computer is very fast. Point 3 is a simple add and divide by 2 of points 1 and 5. Point 2 is the same average of points 1 and 3. See FIG. 4A.

the functions that have been obtained for each pixel, some being global functions and some being interpolated functions, are calculated for each pixel.

The subject method is particularly efficient for image processing for two reasons: the global function has a relatively simple form and thus can be easily computed, and very little computation is required to generate the interpolated functions. Use of functional interpolation provides a major time saving. For example, when 4×4 grids of 16 pixels are used the global function is generated only for 1/16 of the total pixels. It is because of this that high speed, real-time, image processing can be achieved.

The changes to the image caused by the operator actions are carried out and displayed almost instantaneously, i.e. in real time. The operator may, at any moment return and redo a elementary operation. This is because different actions and their results (i.e., the layers) are defined by simple elementary equations. These can be easily modified.

In this way, the invention allows for any image effect, such as airbrushing, blurring, contrasting, dissolving effects, color modifications, in short any operation concerning image graphics and color. The invention also enables geometrical transformations or modifications, such as rotation, changes of scale, etc. Using FITS, a microcomputer system can follow the actions of the operator, using input means such as in general a mouse or light pen on an interactive tracing table, in real time.

This input (e.g. pen) provides two types of command signals: one is a position signal giving the coordinates (x,y) of the dot concerned, and if necessary its environment (for example the path of an airbrush stroke); the other uses the pressure of the pen on the table to create a second type of signal. In the airbrush example, it would govern the density of the color being "sprayed".

The parameters for each elementary operation are constantly updated as the work evolves. To save space and time, only the parameters for dots in the definition grid that have a value or which are show a variation relative to their neighbors are stored. In this way the operator can access, at any moment, either the present overall result of all the operations, or intermediate results corresponding to one or several layers. Thus, the operator can intervene and modify a layer without affecting other layers. The link between the layers is only at the level of recurrence and are taken into account during the RIP stage.

When all the necessary operations are finished, and the operator wishes to produce the final image or an intermediate image at a given definition, the operator orders a raster image processing (RIP) at the required image definition. The RIP computes only those pixels necessary to update the screen, taking into account the portion of the image being displayed and the zoom factor.

The number of dots for which the global function should be generated during image editing within a layer are, in general, relatively small because function evolves with little variation (its second derivative is generally very low for most of the dots in the image). Function only varies substantially at dots corresponding to a large color change.

The grid chosen for the definition of elementary functions may have an equal mesh at all points. Alternatively, it may be constructed using a different sized mesh at various points, depending on whether the image zone covers an area of small or great variation to facilitate processing and correction.

Even if the final image is unsatisfactory, e.g. the control run has been carried out and a proof image printed, it is still possible to go back and correct any intermediate stage to yield a better result.

An alternative method for processing image data in a computerized system, which comprises:

(a) sampling an original image to be processed with a definition grid so as to retain a predetermined number of dots from all of the dots contained within the original image, the predetermined number being approximately equal to the number that can be displayed on a monitor screen to obtain a resulting image; and (b) processing the resulting image into elementary recurrent operations each broken down into three parts and providing, based on the result of the previous elementary operation, these three parts added to each other representing:

first, adopting color dot at position coordinates (x,y) in the new layer (i) from previous layer (i−1) with a weighing ($\alpha_i$) ranging from 0 to ±100%, second, importing a color dot from external image (Ii) into the layer i, after any desired chromatic and geometric transformation ($P_i(x,y)$) of this dot to add it to the color dot (x,y) of the layer (i), the degree of replacement of the dot of the layer (i) by the dot imported from the image (Ii) being defined by a scaler ($\beta_i(x,y)$) with values from 0 to ±100%, and third, chromatically modifying ($\gamma_i(x,y)$) on dot (x,y) of layer (i), each elementary operation (i) being defined by the equation $$\phi_i(x,y) = \alpha_i(x,y) \cdot \phi_{i-1}(x,y) + \beta_i(x,y) \cdot I_i[P_i(x,y)] + \gamma_i(x,y)$$

taking account of the previous operation (i−1), wherein:

$\alpha_i(x,y)$ is a scaler function of the dot (x,y) corresponding to the presence at this dot of the image resulting from the previous elementary operation $\phi_{i-1}(x,y)$, $\phi_{i-1}(x,y)$ is a function representing the previous elementary operation, $\beta_i(x,y)$ is scaler function corresponding to the presence at dot (x,y) of a dot corresponding to the imported image, $I_i$ represents the imported image made up of a set of dots, $P_i(x,y)$ is the function of image import representing the chromatic geometric transfer of one of the set of dots in the image towards the layer (i), to which is applied the elementary operation $\phi_i(x,y)$, $I_i[P_i(x,y)]$ is the function corresponding to the import of the image, $\gamma_i(x,y)$ is a chromatic function representing a color transformation function carried out on a dot (x,y), each of the terms $\beta_i I_i p P_i(x,y)]$ and $\gamma_i(x,y)$ can be zero while the term $\alpha_i(x,y)\, \phi_{i-1}(x,y)$ is normally never zero for all the dots (x,y);

the elementary operations are effected to obtain a function representing i first elementary operations to obtain a function whose parameters are defined at all the dots of the definition grid $$\sum_{j=1}^{j=q} \alpha_j(x, y) \cdot I_j[P_j(x, y)] + \gamma(x, y)$$

wherein, q=number of imported images, $\alpha_j(x,Y)$ is; a scaler analogous to the scaler $\alpha_i(x,y)$ of a elementary function, $I_j$ represents an image j to import, $P_j(x,y)$ is an import function analogous to the previous import functions $P_i(x,y)$, $\gamma(x,y)$ is a chromatic function analogous to chromatic functions $\gamma_i(x,y)$, the global function being defined by interpolating it at the intermediate dots between the dots of the definition grid, these intermediate dots depending on the definition required for the final image, the pixels being calculated for each dot to be obtained.

A system for using this method generally comprises: (a) means for sampling an original image to be processed with a definition grid so as to retain a predetermined number of dots from all of the dots contained within the original image, the predetermined number being approximately equal to the number that can be displayed on a monitor screen to obtain a resulting image, and (b) means for processing the resulting image into elementary recurrent operations each broken down into three parts and providing, based on the result of the previous elementary operation, these three parts added to each other representing the old image, a new imported image and a color change, as above.

The elementary operations are effected to obtain a function representing i first elementary operations to obtain a function whose parameters are defined at all the dots of the definition grid, using the summation function above.

The global function is defined by interpolating it at the intermediate dots between the dots of the definition grid, these intermediate dots depending on the definition required for the final image, the pixels being calculated for each dot to be obtained.

EXAMPLES

1) Airbrushing:

This involves in making a line with a color. As this line imitates that made by an airbrush, it can be treated as a succession of colored dots created by the airbrush spray. The distribution of the color density in a airbrush dot is a Gaussian function. This means that the intensity of the color is at its greatest in the center of the dot, diminishing towards the edges as a Gauss function. In a real airbrush, the intensity depends on the pressure exerted on the trigger, which widens or otherwise changes the ink spray within the air jet. Such a pressure can be simulated in a computerized system by representing (as explained above) a dot by a circle of color with a density variation between the center and edge expressed as a Gauss function. The saturation at the center can vary between 0 and 1 (or zero and 100%).

To sum up, the line of an aerograph is a succession of colored disks, of which it is possible to modify the path (the location of the disk centers), and the color density.

Based on the general equation (1) and the airbrush characteristics, this equation becomes the following:

$$\begin{bmatrix} \varphi_i(x, y) = \alpha_i(x, y)\varphi_{i-1}(x, y) + \gamma_i(x, y) \\ \beta_i(x, y) = 0 \forall (x, y) \\ \gamma_i(x, y) = [1 - \alpha_i(x, y)] \cdot C \\ C = \text{color constant of the "projected material"} \end{bmatrix}$$

and the general equation becomes the following:

$$\phi_i(x,y) = \alpha_i(x,y)\phi_{i-1}(x,y) + [1-\alpha_i(x,y)] \cdot C$$

As there is no imported image in the path of the airbrush, the coefficient of presence $\beta_i$ of an external image is nil at all points of the layer.

The application of the airbrush consists in replacing partially or totally the previous shade of a dot by the shade of the color "projected" by the airspray. Because of this, the chromatic function $\gamma_i(x,y)$ is expressed as a function of the color C and as a complement 1 to the coefficient of presence of the previous image, that is $$\overline{\alpha}_i = 1 - \alpha_i$$

The choice of scaler $\alpha_i(x,y)$ at each dot translates the density of ccolor left by the airbrush.

The function of color presence $\alpha_i(x,y)$ or $[1-\alpha_i(x,y)]$, i.e. $\overline{\alpha}_i$, can be represented by a Gauss function centered on one dot, limited for example to 10% at the edge of the disk. In other words, the two extreme ends of the Gaussian curve beyond 10% (or any other value which may be selected) are suppressed. This means that the Gauss function will not be applied beyond the disk radius chosen.

2) Image fusion:

This operation imports an external image into an existing one. Based on the general equation, this importation operation is defined as; follows:

In the general equation (1) to which are applied the particular conditions relating to this operation:

$$\begin{bmatrix} \varphi_i(x, y) = \alpha_i(x, y)\varphi_{i-1}(x, y) + \beta_i(x, y)I_iP_i(x, y) \\ \gamma_i(x, y) = 0 \\ \beta_i(x, y) = [1 - \alpha_i(x, y)] = \overline{\alpha}_i \end{bmatrix}$$

The chromatic function $\gamma_i$ is zero and the coefficients $\alpha_i$ and $\beta_i$ are complementary coefficients (their sum is equal to one).

In fact, as a hypothesis for this type of operation, a dot of the imported image replaces, more or less, or even completely, a dot of the previous image. This corresponds in the first instance to a more or less pronounced dissolve and in the second to the replacement of the part of the previous image within the contour of the imported one.

The equation below can be simplified and thus gives the equation for image fusion:

$$\phi_i(x,y) = \alpha_i(x,y)\phi_{i-1}(x,y) + \overline{\alpha}_i(x,y) I_iP_i(x,y)$$

3) Lightening/darkening

It should be noted that in the general equation of a layer i, the scaler $\alpha_i$ should never be zero at all points of the layer. On the other hand, if there is no image importation, the scaler $\beta_i$ should be zero at every point (x,y).

To lighten or darken an image, it is necessary to use the chromatic function $\gamma_i(x,y)$. As explained above, the general function $\phi_i(x,y)$ should not be limited to only the chromatic function, for this would mean suppressing all the images in layers 1 to i−1(disappearance of $\phi_{i-1}$), that is, the recurrence.

The darken/lighten function therefore assists in adding a color to the color at the previous dot x,y (function of $\phi_{i-1}$).

Based on the general equation, as follows:

$$\phi_i(x,y)=\alpha_i(x,y)\cdot\phi_{i-1}(x,y)+\beta_i(x,y)\ I_i(P_i(x,y))+\gamma_i(x,y)$$

in which:

$$\begin{bmatrix} \alpha_i(x,y) = 1 \forall\ (x,y) \\ \beta_i(x,y) = 0 \forall\ (x,y) \end{bmatrix}$$

We obtain:

$$\phi_i(x,y)=\phi_{i-1}(x,y)+\gamma_i(x,y)$$

4) Deformation/anamorphosis:

This operation can be applied to an existing or image. In fact, if it is desired to transform part of the image of the layer (i−1), this part of the image is considered as an imported image to be treated as described below.

The deformation/anamorphosis of an image consists of linking to each node a vector of deformation with a direction and size corresponding to the desired deformation. If deformation is uniform over all the relevant part of the image, each node will have attached to it vectors of the same size and direction, which will move the dot corresponding to each node as defined by each vector. The same sampling for the RIP can be used to limit the vector calculation for a group of pixels (e.g. 4×4) by computing only the origin and points just outside the 4×4 grid, and the functionally interpolating, thus speeding computation time.

To achieve such a deformation, the general function of the layer i becomes as follows through the use of the equation defining image import:

$$\phi_i(x,y)=\alpha_i(x,y)\phi_{i-1}(x,y)+\overline{\alpha}_i(x,y)\ I_iP_i(x,y)$$

The deformation or anamorphosis consists in working on the import function $P_i(x,y)$.

5) Levelling:

Levelling a color in part of an image, as an example, in a portrait, enables the operator to remove local skin defects, such as birthmarks. To achieve this, the average intensity of the color is calculated in a disk centered on each node of the part of the image to be processed. Depending on the radius selected, the color will be made more or less uniform. This operation combines the normal image with another which has been averaged out.

6) Contrasting:

Opposite to the previous type of processing, contrasting involves accentuating the fineness of the lines in a drawing or photograph. In a portrait, for example, it would bring out individual hairs of a hairstyle. This would also be useful for surveilance photography.

To achieve this, it is necessary to increase the high-frequency wavelength harmonics without touching the low frequency ones (near the average). The local average would be substituted from individual pixels, accentuating all changes, in the opposite manner from leveling.

The subject invention has been described in terms of its preferred embodiments. Upon reading the disclosure, various alternatives will become obvious to those skilled in the art. These variations are to be considered within the scope and spirit of the subject invention, which is only to be limited by the claims which follow and their equivalents.

What is claimed is:

1. A method for non-destructive, selectably reversible image compositing, comprising:

providing a displayed image comprising at least a region of an original image;

modifying said displayed image to produce a modified displayed image;

producing a modification file including resolution independent parameters operative for selectively modifying said displayed image to produce said modified displayed image and not including said modified displayed image, without destroying the original image; and storing the modification file within a database of images.

2. A method according to claim 1 further comprising:

modifying said modified displayed image to produce a further modified displayed image, after said storing the modification file;

producing a further modification file including resolution independent parameters operative for modifying said displayed image to produce said further modified displayed image and not including said modified displayed image or said further modified displayed image; and storing the further modification file within the database of images.

3. A method according to claim 2 wherein said further modification file and said modification file each include a modification parameter portion, and wherein said modification parameter portion of said further modification file differs from the modification parameter portion of said modification file.

4. A method according to claim 3 wherein the modification parameter portion of said further modification file includes the modification parameter portion of said modification file and an additional modification parameter portion and wherein the modification parameter portion of said modification file may be readily accessed in the further modification file with or without the additional modification parameter portion.

5. A method according to claim 1 wherein said original image is a previously modified image.

6. A method according to claim 1 wherein said original image is a non-previously modified image.

7. A method according to claim 1 also comprising rendering a composited image by:

applying at least some of said resolution independent parameters to at least a portion of said original image to produce composited image data; and supplying said composited image data to a display device for rendering said composited image thereon.

8. A method for rendering a composited image comprising:

providing a database of images including a modification file, the modification file including resolution independent parameters operative for modifying at least one image which is not said composited image to produce said composited image;

selecting at least some of the resolution independent parameters;

applying the selected resolution independent parameters to at least a portion of said at least one image to produce composited image data; and supplying said composited image data to a display device for rendering said composited image thereon.

9. A system for non-destructive, selectably reversible image compositing, comprising:

a display providing a displayed image comprising at least a region of an original image;

an image modifying user interface modifying said displayed image without destroying the original image, to produce a modified displayed image; and a database of images storing a modification file, the modification file including resolution independent parameters operative for selectively modifying said displayed image to produce said modified displayed image and not including said modified displayed image.

10. A system according to claim 9 wherein said image modifying user interface is also operative for modifying said modified displayed image to produce a further modified displayed image, after said modification file is stored in said database of images, and wherein said database of images is also operative for storing a further modification file, the further modification file including resolution independent parameters operative for modifying said displayed image to produce said further modified displayed image and not including said modified displayed image or said further modified displayed image.

11. A system according to claim 10 wherein said further modification file and said modification file each include a modification parameter portion, and wherein said modification parameter portion of said further modification file differs from the modification parameter portion of said modification file.

12. A system according to claim 11 wherein the modification parameter portion of said further modification file includes the modification parameter portion of said modification file and an additional modification parameter portion and wherein the modification parameter portion of said modification file may be readily accessed in the further modification file with or without the additional modification parameter portion.

13. A system according to claim 9 wherein said original image is a previously modified image.

14. A system according to claim 9 wherein said original image is a non-previously modified image.

15. A system according to claim 9 for rendering a composited image further comprising a renderer applying at least some of said resolution independent parameters to at least a portion of said displayed image to produce composited image data and a display device for using said composited image data to render said composited image thereon.

16. A system for rendering a composited image comprising:

a database of images including a modification file, the modification file including resolution independent parameters operative for modified at least one image which is not said composited image to produce said composited image;

an image processor selecting at least some of the resolution independent parameters and applying the selected resolution independent parameters to at least a portion of said at least one image to produce composited image data; and a display device for rendering said comaposited image thereon.

* * * * *